(12) United States Patent
Singh

(10) Patent No.: US 7,090,885 B2
(45) Date of Patent: *Aug. 15, 2006

(54) LOW ISOFLAVONES, HIGH SAPONINS SOY PROTEIN PRODUCT AND PROCESS FOR PRODUCING THE SAME

(75) Inventor: Navpreet Singh, Fort Wayne, IN (US)

(73) Assignee: Solae, LLC, St. Louis, MO (US)

( * ) Notice: Subject to any disclaimer, the term of this patent is extended or adjusted under 35 U.S.C. 154(b) by 158 days.

This patent is subject to a terminal disclaimer.

(21) Appl. No.: 10/431,188

(22) Filed: May 7, 2003

(65) Prior Publication Data

US 2004/0013791 A1 Jan. 22, 2004

Related U.S. Application Data

(60) Provisional application No. 60/378,618, filed on May 7, 2002.

(51) Int. Cl.
*A23L 1/20* (2006.01)

(52) U.S. Cl. ........................ 426/598; 426/656; 426/634

(58) Field of Classification Search ................ 426/634, 426/656, 598; 530/378
See application file for complete search history.

(56) References Cited

U.S. PATENT DOCUMENTS

| | | | |
|---|---|---|---|
| 3,995,071 A * | 11/1976 | Goodnight et al. ......... | 426/598 |
| 4,420,425 A | 12/1983 | Lawhon | |
| 5,086,166 A | 2/1992 | Lawhon et al. | |
| 5,702,752 A | 12/1997 | Gugger et al. | |
| 5,792,503 A | 8/1998 | Gugger et al. | |
| 5,804,234 A * | 9/1998 | Suh et al. .................... | 426/69 |
| 5,858,449 A | 1/1999 | Crank et al. | |
| 5,936,069 A | 8/1999 | Johnson | |
| 5,994,508 A | 11/1999 | Bryan et al. | |
| 6,132,795 A * | 10/2000 | Holbrook et al. ........... | 426/634 |
| 6,171,638 B1 | 1/2001 | Gugger et al. | |
| 6,592,910 B1 * | 7/2003 | Banz et al. .................. | 424/757 |
| 6,818,246 B1 * | 11/2004 | Singh ........................... | 426/656 |
| 2002/0098276 A1 | 7/2002 | Porter et al. | |
| 2002/0102346 A1 | 8/2002 | Stark et al. | |
| 2002/0106437 A1 | 8/2002 | Karleskind et al. | |
| 2002/0106440 A1 | 8/2002 | Porter et al. | |
| 2002/0114877 A1 | 8/2002 | Stark et al. | |
| 2003/0186401 A1 * | 10/2003 | Shin et al. ................... | 435/155 |

FOREIGN PATENT DOCUMENTS

| | | |
|---|---|---|
| EP | 0 795 553 A1 | 9/1997 |
| JP | 59-232052 | * 12/1984 |
| JP | 7-304655 | * 11/1995 |
| WO | WO 98/10665 | 3/1998 |

OTHER PUBLICATIONS

Abstract—XP-002231437 JP20000312853 Oct. 13, 2000, Preparation of Soybean Protein with Low Content of Isoflavone, Involves Contacting Soybean Protein Solution to Synthetic Resin by Multistage Batch Type or Continuous Column Process.
Abstract—XP-002251444 JP19830106069 Jun. 14, 1983, Improved Soybean Protein Material . . .
Article—XP-002251443, Ireland et al. Saponin Content of Soya and Some Commercial Soya Products by Means of High-Performance Liquid Chromatography of the Sapongenins.

* cited by examiner

*Primary Examiner*—Anthony Weier
(74) *Attorney, Agent, or Firm*—Holly M. Amjad; James L. Cordek; Cary A. Levitt

(57) ABSTRACT

A soy protein material having a very low isoflavones content and a high saponins content is produced by a process that involves removal, by adsorption, of isoflavones from a soy protein material obtained by removing fiber from soy flour or flakes. The soy protein material also has a high Nitrogen Solubility Index ("NSI"). The low isoflavones, high saponins soy protein material has at least about 55.0 wt. % protein, less than about 200 μg/g isoflavones of total dry matter and at least about 1000 μg/g soyasapogenols of total dry matter. The process for producing the low isoflavones, high saponins soy protein material involves removing fiber from a defatted soybean material and obtaining a liquor that is subsequently pasteurized. Next, sugars and other small molecular weight components are optionally removed from the liquor using membrane separation to increase the protein content of the final material. The resulting liquor or retentate is subjected to adsorptive removal of isoflavones, and is optionally pasteurized and spray dried.

15 Claims, No Drawings

US 7,090,885 B2

LOW ISOFLAVONES, HIGH SAPONINS SOY PROTEIN PRODUCT AND PROCESS FOR PRODUCING THE SAME

CROSS REFERENCE TO RELATED APPLICATIONS

This application claims the benefit under Title 35, U.S.C. § 119(e) of U.S. Provisional patent application Ser. No. 60/378,618, entitled PROCESS FOR PRODUCING HIGH SOLUBILITY, ISOFLAVONES-DEPLETED SOY PROTEIN MATERIAL AND THE PRODUCT THEREOF, filed on May 7, 2002.

BACKGROUND OF THE INVENTION

1. Field of the Invention

This invention relates to a low isoflavones, high saponins vegetable material and a process for producing the same.

2. Description of the Related Art

The benefits of soy protein are well documented. Cholesterol is a major concern with consumers throughout the industrialized world. It is well known that vegetable products contain no cholesterol. For decades, nutritional studies have indicated that the inclusion of soy protein in the diet actually reduces serum cholesterol levels in people who are at risk. The higher the cholesterol, the more effective soy proteins are in lowering that level.

Soybeans have the highest protein content of all cereals and legumes. In particular, soybeans have about 40.0 wt. % protein, while other legumes have 20.0–30.0 wt. %, and cereals have about 8.0–15.0 wt. % protein. Soybeans also contain about 20.0 wt. % oil with the remaining dry matter mostly carbohydrate (35.0 wt. %). On a wet basis (as is), soybeans contain about 35.0 wt. % protein, about 17.0 wt. % oil, about 31.0 wt. % carbohydrates, and about 4.4 wt. % ash.

In the soybean, both protein and lipid bodies are contained in the usable meat of the soybean (called the cotyledon). The complex carbohydrate (or dietary fiber) is also contained in the cell walls of the cotyledon. The outer layer of cells (called the seed coat) makes up about 8.0 wt. % of the soybean's total weight. The raw, dehulled soybean is, depending on the variety, approximately 18.0 wt. % oil, 15.0 wt. % soluble carbohydrates, 15.0 wt. % insoluble carbohydrates, 14.0 wt. % moisture and ash, and 38.0 wt. % protein.

In processing, soybeans are carefully selected for color and size. The soybeans are then cleaned, conditioned (to make removal of the hull easier) and cracked, dehulled and rolled into flakes. The flakes are subjected to a solvent bath that removes the oil. The solvent is removed and the flakes are dried, creating the defatted soy flakes that are the basis of all soy protein products. Despite the large number of products on the market, there are only three types of defatted soy protein products: flours, concentrates, and isolates.

Soy flours are the simplest forms of soy protein, having a protein content of approximately 50.0 wt. %. Simply grinding and screening the defatted flakes produces soy flours. This simple processing leaves the soy flour with many of the soybean's characteristics. The lack of processing also makes soy flours highly variable in terms of quality.

Soy flours and grits are still widely produced and are used most often in baked goods, snack foods and pet foods applications where the high flavor profile does not pose a problem. Textured soy flours were an early attempt at simulating or enhancing the texture of meat products. Texturizing does not change the composition of soy flours and reduces the flavor profile only slightly. Their primary applications are inexpensive meat products or pet foods.

Soy concentrates have at least 65.0 wt. % protein on a moisture-free basis. Soy protein concentrates are made by removing soluble carbohydrate material from defatted soy meal. Aqueous alcohol extraction (60–80% ethanol) or acid leaching (isoelectric precipitation) are the most common means for carbohydrate removal. In both aqueous alcohol extraction and acid leaching, however, essentially all of the protein is rendered insoluble. Protein solubility may be partially recovered in acid leach products by neutralization. Also, in aqueous alcohol extraction, the isoflavones and saponins are extracted into the alcohol phase, and are subsequently discarded. Thus, soy protein concentrates which are produced using aqueous alcohol extraction have at most only trace amounts of isoflavones and saponins. A myriad of applications have been developed for soy concentrates and texturized concentrates in processed foods, meat, poultry, fish, cereal and dairy systems.

Isolates are produced through standard chemical isolation, drawing the protein out of the defatted flake through solubilization (alkali extraction at pH 7–10) and separation followed by isoelectric precipitation. As a result, isolates are at least 90.0 wt. % protein on a moisture-free basis. They are sometimes high in sodium and minerals (ash content), a property that can limit their application. Their major applications have been in dairy substitution, as in infant formulas and milk replacers.

Isoflavones occur in a variety of leguminous plants and oilseeds, including vegetable protein materials such as soybeans. These compounds generally include daidzin, 6"-O-acetyldaidzin, 6"-O-malonyldaidzin, daidzein, genistin, 6"-O-acetylgenistin, 6"-O-malonylgenistin, genistein, glycitin, 6"-O-malonylglycitin, glycitein, biochanin A, and formononetin.

It has recently been suggested that the isoflavones contained in vegetable proteins such as soybeans may inhibit the growth of human cancer cells, such as breast cancer cells, prostate cancer cells and colon cancer cells. In addition, isoflavones also have been suggested to reduce cardiovascular risk factors, for example by reducing the levels of atherosclerosis inducing lipoproteins and low-density cholesterol and by increasing endothelial dependent vasodilation response. Isoflavones are also showing great promise in preventing osteoporosis and treating menopausal symptoms.

Isoflavone compounds have been associated with an inherent, bitter flavor in vegetable protein materials such as soybeans. In the commercial production of such protein materials, such as protein isolates and protein concentrates, the focus has been to remove isoflavone compounds. For example, in a conventional process for the production of a soy protein isolate, soy flakes are extracted with an aqueous medium having a pH above the isoelectric point of the protein to solubilize the protein. The extract containing the protein is separated from insoluble fiber materials to provide a protein extract. Most of the isoflavones are solubilized in the extract as well as the protein. The protein is precipitated by acid leaching, i.e., adjusting the pH of the extract to about the isoelectric point of the protein, typically between 4.2 and 4.6 for soy protein, with an acid. The precipitated protein is then separated from the extract. Much of the isoflavones remain solubilized in the extract following separation of the precipitated protein (curd) from the extract; however, some of the isoflavones are usually present in the precipitated curd. After separation of the precipitated protein curd from the extract, the extract and the isoflavones solubilized therein are usually discarded. Any residual isoflavones left in the separated protein are removed by exhaustive washing of the protein to ensure that the taste associated with the isoflavones is not present in the protein. Also, the foregoing washing process tends to remove saponins as well as isoflavones.

Problematically, isoelectric precipitation reduces the solubility of the proteins. Therefore, soy protein concentrates and isolates made using the foregoing process usually have low solubility, as indicated by their low Nitrogen Solubility Index ("NSI"), which is typically less than about 70%.

Soybeans contain about 0.5 wt.% saponins. Soy saponins have been the subject of investigation since the early $20^{th}$ century. These compounds consist of a triterpenoid skeleton with various sugar and acetyl moieties. The current consensus is that soyasapogenols A, B, and E are true aglycons, while soyasapogenols C and D are artifacts of hydrolysis that occurs during the process of their isolation. The corresponding glycosides are the so-called "group A saponins," "group B saponins," and "group E saponins," respectively.

Soy saponins have been suggested to demonstrate antimutagenic properties that make them promising agents for cancer prophylaxis. Moreover, it has been suggested that group B soy saponins have exhibited pronounced suppressive effects on the replication in vitro of the human immunodeficiency virus (HIV). The chemical structure of soybean saponins is very similar to that of the compound glycyrrhizin, a known anti-viral agent, so soy saponins show promise as building blocks for the synthesis of anti-viral pharmaceutical compounds.

Despite the cultivation and processing of very large quantities of soybeans, at the present time soy saponins are not a significant article of commerce due to the difficulty of isolating and purifying them.

SUMMARY OF THE INVENTION

The present invention provides a low isoflavones, high saponins soy protein product, and a method for producing a low isoflavones, high saponins soy protein product. The soy protein product has a high Nitrogen Solubility Index ("NSI"), and a lower isoflavones content than in conventionally available soy protein materials. Also, the present soy protein material has a high saponins content.

A low isoflavones, high saponins soy protein material is provided, having at least about 55.0 wt. % protein, less than about 200 μg/g of isoflavones, and at least about 1000 μg/g of soyasapogenols (saponins). Alternatively, the protein content of the soy protein material may be at least about 65.0 wt. % to provide a soy protein concentrate, or may be at least about 90.0 wt. % to provide a soy protein isolate.

A process for producing the low isoflavones, high saponins soy protein material is provided, including the steps of providing a defatted soybean material having at least 45.0 wt. % protein (N×6.25), about 30.0–40.0 wt. % carbohydrates, about 5.0–10.0 wt. % moisture, less than about 1.0 wt. % fat, and a Nitrogen Solubility Index (NSI) of at least 70%. The soybean material is slurried with water at a solids level of about 5.0–15.0 wt. %, and the pH of the slurry is adjusted to between about 7.0 to about 7.5. The pH adjusted slurry is subjected to a centrifuging process to form a liquor that is subsequently pasteurized. Sugars and other small molecular weight components may optionally be removed from the liquor using membrane ultrafiltration or another separation technique to increase the protein content of the soy protein product. The resulting retentate from the membrane ultrafiltration process is subjected to an adsorption process in which isoflavones are removed by adsorption. The resulting isoflavones-depleted soy protein material is pasteurized and then is optionally spray dried.

Alternatively, the liquor recovered from the centrifugation process is subjected to the adsorption process to remove isoflavones, without the intervening step of subjecting the liquor to ultrafiltration. The resulting isoflavones-depleted soy protein material is pasteurized and then is optionally spray dried.

The present process provides a novel, economically efficient method of producing a soy protein material with a depleted isoflavone profile from soybeans conventionally grown by farmers and used by soybean processors. The low isoflavones soy protein material has a high saponins content and contains highly soluble proteins, as characterized by a high Nitrogen Solubility Index.

In one form thereof, the present invention provides a soy protein material, including a protein content of at least about 55.0 wt. % of total dry matter; an isoflavone content of less than about 200 μg/g of total dry matter; and a soyasapogenols content of at least about 1000 μg/g of total dry matter.

In another form thereof, the present invention provides a method of producing a soy protein product, including the steps of: (a) providing a substantially defatted soybean material; (b) mixing the material with water and extracting proteins from the material; (c) removing insolubles to produce a liquor; (d) heat treating the liquor; and (e) subjecting the liquor to an adsorption process in which isoflavones are removed by adsorption.

DETAILED DESCRIPTION

A low isoflavones, high saponins soy protein material is provided having at least 55.0 wt. % protein, less than 200 μg/g isoflavones, at least about 1000 μg/g soyasapogenols (saponins), and less than about 3.0 wt. % crude fiber of the total dry matter. The product also has a Nitrogen Solubility Index ("NSI") of at least 70%, and preferably about 75% or above.

A method for manufacturing a low isoflavones, high saponins soy protein material is provided, including the steps of providing a substantially defatted soybean material; extracting protein from the material; removing fiber from the material; optionally reducing the amount of carbohydrates and minerals by ultrafiltration while retaining isoflavones and saponins; subjecting the retentate or fiber removed suspension to an adsorption process to remove isoflavones; and pasteurizing the isoflavones-depleted suspension.

Generally, the present method encompasses: 1) dehulling whole soybeans; 2) flaking the dehulled soybeans; 3) extracting soybean oil from the flaked soybeans with a solvent such as hexane; 4) desolventizing the defatted soybean flakes without high heating or toasting to produce "white" flakes; 5) removing fiber from the soy flakes; 6) optionally ultrafiltering the liquor (fiber removed slurry) to remove carbohydrates and minerals while retaining isoflavones and saponins; 7) contacting the suspension with an adsorbent that removes isoflavones by adsorption; 8) pasteurizing the isoflavones-depleted suspension; and 9) optionally drying the pasteurized, isoflavones-depleted suspension.

Steps 1 through 4 described above are commonly referred to as the extraction process for soybeans. The general procedure for the above-described steps 1 through 4 is well understood, as described in U.S. Pat. No. 5,097,017 to Konwinski, assigned to the assignee of the present invention, the disclosure of which is expressly incorporated herein by reference.

The first item described above is dehulling. Dehulling is the process in which the soybean hulls are removed from the whole soybeans. The soybeans are carefully cleaned prior to dehulling to remove foreign matter, so that product will not be contaminated by color bodies. Soybeans also are normally cracked into about 6 to 8 pieces prior to dehulling.

The hull typically accounts for about 8.0 wt. % of the weight of the whole soybean. The dehulled soybean is about 10.0 wt. % water, 40.0 wt. % protein, 20.0 wt. % fat, with the remainder mainly being carbohydrates, fiber and minerals.

The second step described above is the flaking process. Soybeans are conditioned prior to flaking by adjusting moisture and temperature to make the soybean pieces sufficiently plastic. The conditioned soybean pieces are passed through flaking rolls to form flakes about 0.01 to 0.012 inches (in.) thick.

The third step described above is soybean oil removal from the flakes. The soybean flakes are defatted by contacting them with a solvent, such as hexane, to remove the soybean oil. Soybean oil is used in many applications, such as margarine, shortening and other food products, and is a good source of lecithin, which has many useful applications as an emulsifier.

In the fourth step described above, the hexane-defatted soybean flakes are desolventized to remove the solvent, without toasting, to produce white flakes. The white flakes may be ground to make soy flour. Soy flour that can be used as a starting material for the subject invention is readily, commercially available. Commercial soy flour typically has at least 50.0 wt. % (52.5 wt. %) protein (N×6.25); about 30.0 to 40.0 wt. % (34.6 wt. %) carbohydrates; about 5.0 to 10.0 wt. % (6.0 wt. %) moisture; about 5.0 to 10.0 wt. % (6.0 wt. %) ash; about 2.0 to 3.0 wt. % (2.5 wt. %) crude fiber and less than about 1.0 wt. % (0.9 wt. %) fat (as determined by ether extraction).

The soy flour may have a protein dispersibility index ("PDI") of 90%. PDI is determined by American Oil Chemist's Society (AOCS) method Ba 10–65. Soy flour having 90% PDI would be soy flour with no heat treatment and is enzyme active. The soy flour may be 80-mesh, which means that more than 95 wt. % of the soy flour passes through a number 80 mesh USA standard sieve. According to one embodiment of the present invention, the starting material which can be soy flour or soy flakes is produced according to a separate process, as described in steps 1–4 above. Then, a soy protein material is produced according to the steps discussed below. Soy flour or soy flakes with protein dispersibility index ("PDI") of greater than 90% are commercially available from several companies.

The next step involves extracting protein from the material and removing fiber. This is accomplished by slurrying the starting material with water and subjecting the slurry to a separation or clarification process such as centrifugation to thereby extract water-soluble proteins from the material. The water used to slurry the material may be pre-heated to a temperature of from about 27° C. to about 70° C., and the slurry may have a solids content of between about 5.0 wt. % and about 15.0 wt. %. Agitation or mixing is typically used to slurry the starting material. One means for performing the mixing is a propeller-type agitator.

One means for removing fiber is adjusting the pH of the slurry to between about 6.8 and about 10.0 with alkali, such as sodium hydroxide, and then separating the slurry to form a cake and liquor. The separation can be performed by a number of physical separation means; however, centrifugation is the most efficient and effective means. A scroll-type centrifuge may be used to perform the separation, or the separation can be performed with a disc-type or tubular centrifuge. Although sodium hydroxide is used in the examples herein, other alkaline reagents may be employed such as potassium hydroxide and calcium hydroxide.

Then, the fiber-removed material may be heat treated, such as by pasteurization at a temperature of about 80° C. or higher, preferably about 93° C. or higher. Pasteurization may be carried out by jet cooking or by holding in a steam-jacketed kettle, for example. Alternatively, this heat treatment step may be conducted prior to the foregoing fiber removal step. After heat treatment, the pH of the material may optionally be adjusted with a suitable acid to reduce the pH of the material to between about 6.5 and about 7.5. Typically, this pH reduction is performed when the initial water extraction is carried out at a pH toward the upper end of the above-cited range of between about 6.8 and about 10.0. It has been found that adjusting the pH of the material to between about 6.5 and about 7.5 after heat treatment provides a soy protein material which, when reconstituted in water at a 10.0 wt. % suspension, has a pH of between about 6.5 and about 8.0.

The material may then be subjected to an adsorption process, as described below, to remove isoflavones from the material. Alternatively, before being subjected to the adsorption process, the material may first be subjected to an ultrafiltration process, described below, to remove small molecular weight components and to concentrate the proteins in the material.

In particular, the fiber-removed material (the liquor) is optionally ultrafiltered using a 5,000 to 60,000 molecular weight cut-off ("MWCO") membrane, preferably a 5,000–30,000 MWCO membrane, to concentrate the proteins. The ultrafiltration membrane concentrates the protein content of the liquor in the retentate by permeating carbohydrates and minerals in permeate while retaining isoflavones and saponins in retentate. Isoflavones and saponins are small molecular weight components, typically having a molecular weight of less than 1500. Surprisingly, however, it has been found that the majority of the isoflavones and saponins are retained by the ultrafiltration membranes in the retentate. It is believed at this time that the isoflavones and saponins might complex with the proteins such that the isoflavones and saponins are retained in the retentate and not permeated along with the carbohydrates and minerals.

Typically, the ultrafiltration is conducted at a temperature of between about 25° C. and about 60° C., preferably between about 25° C. and about 50° C. It is thought that isoflavones and saponins are less soluble in water and complex with proteins to a greater extent at lower temperatures, and conversely, are more soluble in water and complex with proteins to a lesser extent at higher temperatures. Thus, a greater amount of isoflavones and saponins will be retained in the retentate when the ultrafiltration is performed toward the lower end of the above temperature range of between about 25° C. and about 60° C., and a lesser amount of isoflavones and saponins will be retained in the retentate when the ultrafiltration is performed toward the upper end of the above temperature range of between about 25° C. and about 60° C.

Suitable membranes of different molecular weight cut-offs are readily and commercially available from several vendors, such as Koch Membrane Systems of Wilmington, Mass.; Osmonics of Minnetonka, Minn.; PTI Advanced Filtration of Oxnard, Calif.; and Synder Filtration of Vacaville, Calif.

Also, the protein content of the retentate may be controlled based upon the amount of permeate removed from the product by ultrafiltration—the more permeate removed, the higher the protein content; the less permeate removed, the lower the protein content. For example, in order to achieve a retentate with at least 90.0 wt % protein content, diafiltration is performed in the present method. Diafiltration refers to the process of adding water to the retentate and continuing the removal of membrane-permeating species in the permeate. Diafiltration can be conducted under either of two modes in the present method: discontinuous or continuous diafiltration. Discontinuous diafiltration is an operation wherein permeable solutes are removed in permeate from the retentate by volume reduction, followed by redilution and re-ultrafiltration in repetitive steps. Continuous diafiltration involves adding water to the feed tank at the same rate at which permeate is being removed by the membranes.

In the next step, the centrifuged liquor or membrane retentate is contacted with an adsorbent material that removes isoflavones by adsorption. Suitable adsorbents include ionic or non-ionic synthetic adsorbent resins. Exemplary adsorbents used in the Examples herein are SP825, SP850 and SP207, which are synthetic adsorbent resins available from Mitsubishi Chemical America of White Plains, N.Y. under the trademarks Dianion® and Sepabeads®. Another adsorbent used in the Examples herein is Dowex Optipore SD-2 adsorbent, which is a polymeric adsorbent available from The Dow Chemical Company of Midland, Mich. These and similar synthetic adsorbent resins can be used to physically adsorb and retain isoflavones, thereby removing isoflavones from the pasteurized centrifuge liquor or membrane retentate. According to one embodiment, the synthetic adsorbent resins are prewashed with sodium hydroxide, followed by treatment with hydrochloric acid before use.

In the present process, isoflavones are removed from the material by the adsorption process while saponins are not. Although the precise reason for this is not clear at present, it is thought that the saponins might complex with the proteins in the material to a greater extent than do the isoflavones, such that the saponins are not adsorbed.

In some of the Examples below, the synthetic adsorbent resins were mixed into the retentate and then separated therefrom by filtering through a sieve. In other Examples below, conventional adsorption columns containing a suitable adsorbent material were used, in which the adsorbent was regenerated as necessary. In commercial practice, conventional adsorption columns containing suitable adsorbent material are used and regenerated/cleaned as necessary.

The isoflavones-depleted liquor or retentate may then be pasteurized again at a temperature of about 80° C. or higher. Pasteurization may be carried out by jet cooking or by holding in a steam-jacketed kettle.

In the last step, which is optional, the isoflavones-depleted soy protein material is dried. Drying may be carried out with a vertical spray dryer with a high-pressure nozzle.

The dried isoflavones-depleted soy protein material may be coated with commercial lecithin or other food-grade surfactants, such as mono-diglycerides, to improve water dispersibility and reduce clumping of the material. Such a coating addition would be in the range of about 0.5 wt. % to about 2.0 wt. %, for example.

The isoflavones-depleted soy protein material has many uses. For example, it can be used as a milk replacer and in drink mixes and beverages, such as chocolate, vanilla and pineapple beverages; dairy products, such as fruit yogurt; nutrition and health products, such as protein bars; whole muscle meat injection; surimi products; emulsified meats; cereal products, such as breakfast cereals; bakery products, such as blueberry muffins and other liquid or dry beverage, food or nutritional products.

In the Examples below, Nitrogen Solubility Index ("NSI") was measured according to American Oil Chemists' Method Ba 11-65. NSI characterizes the amount of protein in the product which is water-soluble, for example, a protein product having an NSI of 75% means that 75 wt. % of the protein therein is water-soluble.

The method for measuring solubility index is described in *Standard for Grades of Dry Milks including Methods of Analysis*, Bulletin 916, American Dairy Products Institute, Chicago, Ill. 60606.

Also, in the Examples below, isoflavones were characterized by the procedure described in Thiagarajan, D. G., Bennink, M. R., Bourquin, L. D., and Kavas, F. A., *Prevention of precancerous colonic lesions in rats by soy flakes, soy flour, genistein, and calcium*, Am. J. Clin. Nutr. 1998; 68(suppl.); 1394S-9S.

The amount of Bowman-Birk Inhibitor ("BBI") in the product was characterized by the presence of Chymotrypsin Inhibitor ("CI"), which is an indirect assay for BBI. The method used for CI analysis is based on the American Oil Chemists' Society (AOCS) official method Ba 12-75 for trypsin inhibitor activity for soy products, differing in the enzyme and substrate used. The substrate used for CI analysis is N-Glutaryl-L-phenylalanine p-nitroanilide (GPNA), available from Sigma-Aldrich as product number 49738. The enzyme used is α-Chymotrypsin from bovine pancreas (Enzyme Commission (EC) Number: 3.4.21.1), available from Sigma-Aldrich as product number C4129. The AOCS method is based upon Kakade et al. (*Cereal Chemistry*, 51. 376 (1974)). Chymotrypsin hydrolyzes the substrate N-Glutaryl-L-phenylalanine-p-nitroanilide present in excess. The release of p-nitroanilide, a yellow dye, is measured spectrophotometrically. In the presence of soy protein product, the release of p-nitroanilide changes inversely with the level of active chymotrypsin inhibitor.

Saponins were analyzed using High Performance Liquid Chromatography ("HPLC"). An HPLC-based analytical method was developed and validated to estimate saponin precursors present in soybean. The method is based on isolation of total saponins from finely ground soybean or soybean products using an ethanolic extraction followed by acid hydrolysis to cleave the conjugated sugar chain(s) to form their aglucones (soyasapogenols). Resulting soyasapogenols were isolated and concentrated by solid phase extraction techniques. Soyasapogenols were resolved using a reverse phase column with isocratic elusions and detected using an Evaporative Light Scattering Detector ("ELSD"). The quantification of soyasapogenols was performed using the calibration curves derived against authentic compounds. The total soya saponins content is approximately twice the total soyasapogenol content (Duhan et al. (2001) *Int. J Food Sci. Nutr.* 52:53–59).

Viscosity of the product was measured using a viscometer. 220 grams of high purity water at approximately 22.2° C. (72±2° F.) was added into the 1.2 L glass jar of a Waring 7-speed 1-liter laboratory blender (Model: 7012G, Waring Products, Torrington, Conn. 06790). 15 drops of antifoam (KFO1204A, Lubrizol Corporation, Wickliffe, Ohio 44092) were added to the water. The blender was turned on at speed 1 (low). Low speed setting operated the blender at 3500±300 rpm. 30 grams of protein product were added as a steady stream into the vortex of the water to thereby provide a 12.0 wt. % solution. After adding the entire protein product, the blender was run for 15 seconds. After 15 seconds of mixing (blender off), the sides of the blender and blades were scraped with a spatula to resuspend non-blended material. The suspension was mixed again by turning the blender on at speed 1 (low) for 1 minute. A 150-ml beaker was filled with the mixed protein suspension to about ½ inch from the top. The viscosity was determined using a Brookfield Viscometer (Model: RVDVEA115, Brookfield Engineering Laboratories, Inc., Middleboro, Mass. 02346) using the appropriate spindle. The motor of the viscometer was turned on with the speed set to 100 rpm and the reading recorded at 15 seconds. Two readings were taken in this manner, and the average of two readings was used to calculate viscosity in centipoise (cp) from the conversion chart. Spindle number 2 was used if the viscosity was in the range of 50–200 cp and spindle number 3 was used if the viscosity was in the range of 200–600 cp.

These and other aspects of the present invention may be more readily understood by reference to one or more of the following examples.

EXAMPLE 1

227.1 L (60 gallons) of water were added to a mixing tank and heated to 60° C. 45.4 kg (100 lbs.) of soy white flakes were added to the mixing tank. 1400 ml of a 4.5% NaOH solution was added to increase the pH of the resulting slurry to about 7.0. The batch was mixed for 10 minutes at 55–58° C. and then transferred to the centrifuge feed tank, which contained 303.0 L (80 gallons) of water heated to 60° C. The pH of the mixed slurry was 7.01. The slurry was mixed for 20 minutes at 55–58° C. and thereafter fed at a rate of two gallons per minute (gpm) to a Sharples scroll-type centrifuge. The liquor from the centrifuge was pasteurized by jet cooking at 127° C. The pasteurized liquor was transferred to a membrane feed tank through a 100-mesh strainer. The liquor was fed to an ultrafiltration membrane system having a 10,000 MWCO spiral-wound membrane. The temperature of the liquor was maintained at 26.5–26.8° C. during membrane processing. About 75% of the original feed volume added to the membrane feed tank was removed as permeate. The retentate from the membrane system was pasteurized at 77° C.

About 1.0 L of the pasteurized retentate was freeze dried. The dried product was analyzed to determine the content thereof. The results of the analysis are shown in TABLE 1. All results are on moisture-free basis, unless otherwise stated.

TABLE 1

Composition of product derived from the method of EXAMPLE 1

| Composition | | mg/g of total dry matter |
|---|---|---|
| Protein (wt. %) | | 78.13 |
| Crude Fiber (wt. %) | | 1.12 |
| Crude Fat (wt. %) | | 0.02 |
| Ash (wt. %) | | 6.28 |
| Isoflavones | | 5.86 |
| | Daidzin | 1.38 |
| | Glycitin | 0.29 |
| | Genistin | 1.91 |
| | 6"-O-malonyldaidzin | 0.83 |
| | 6"-O-malonylglycitin | 0.16 |
| | 6"-O-acetyl genistin | 0.09 |
| | 6"-O-malonylgenistin | 1.16 |
| | Daidzein | 0.02 |
| | Genistein | 0.02 |

EXAMPLE 2

250.0 ml of a synthetic adsorbent resin (SP825 from Mitsubishi Chemical America of White Plains, N.Y.) was sequentially rinsed with water, rinsed with 4% sodium hydroxide solution, rinsed with water, rinsed with 4% hydrochloric acid solution, and rinsed with water. 750.0 ml of the retentate from Example 1 was mixed with the rinsed resin in a beaker. The mixture was stirred for 30 minutes. After stirring, the mixture was filtered using a US standard No. 400 sieve. The resin was retained by the sieve and the filtrate was collected. The resin treated filtrate was freeze dried to obtain a soy protein material. The dried product was analyzed to determine the content thereof. The results of the analysis are shown in TABLE 2. All results are on moisture-free basis, unless otherwise stated.

TABLE 2

Composition of product derived from the method of EXAMPLE 2

| Composition | | µg/g of total dry matter |
|---|---|---|
| Protein (wt. %) | | 80.02 |
| Crude Fiber (wt. %) | | 1.03 |
| Crude Fat (wt. %) | | 0.04 |
| Ash (wt. %) | | 7.10 |
| Isoflavones | | 90.0 |
| | Daidzin | 10.0 |
| | Glycitin | 0 |
| | Genistin | 50.0 |
| | 6"-O-malonyldaidzin | 10.0 |
| | 6"-O-malonylglycitin | 0 |
| | 6"-O-acetyl genistin | 0 |
| | 6"-O-malonylgenistin | 20.0 |
| | Daidzein | 0 |
| | Genistein | 0 |
| Nitrogen Solubility Index (NSI) (%) | | 95.3 |

EXAMPLE 3

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 7.43. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and transferred to a membrane feed tank through a 100-mesh strainer. The suspension was fed to an ultrafiltration membrane system containing two spiral-wound membranes, both of 10,000 MWCO. The temperature of the suspension was maintained at about 26.7° C. (80° F.) during membrane processing. About 75% of the original feed volume added to the membrane feed tank was removed as permeate. About 1.0 L of the retentate from the membrane system was freeze dried. The dried product was analyzed to determine the content thereof. The results of the analysis are shown in TABLE 3. All results are on moisture-free basis, unless otherwise stated.

TABLE 3

Composition of product derived from the method of EXAMPLE 3

| Composition | | μg/g of total dry matter | |
|---|---|---|---|
| Protein (wt. %) | | 82.69 | |
| Crude Fiber (wt. %) | | 0.40 | |
| Crude Fat (wt. %) | | 0.04 | |
| Ash (wt. %) | | 6.48 | |
| Fructose (wt. %) | | 0.37 | |
| Glucose/Galactose (wt. %) | | 0 | |
| Sucrose (wt. %) | | 3.88 | |
| Raffinose (wt. %) | | 0.58 | |
| Stachyose (wt. %) | | 3.25 | |
| Isoflavones | | | 3535.8 |
| | Daidzin | | 559.3 |
| | Glycitin | | 88.0 |
| | Genistin | | 691.1 |
| | 6"-O-malonyldaidzin | | 747.2 |
| | 6"-O-malonylglycitin | | 98.3 |
| | 6"-O-acetyl genistin | | 51.7 |
| | 6"-O-malonylgenistin | | 1134.2 |
| | Daidzein | | 80.8 |
| | Genistein | | 85.2 |
| Soyasapogenols | | | 3935.8 |
| | soyasapogenol A | | 999.1 |
| | soyasapogenol B | | 2936.7 |
| Nitrogen Solubility Index (NSI) (%) | | 51.0 | |

EXAMPLE 4

250.0 ml of a synthetic adsorbent resin (SP207 from Mitsubishi Chemical America of White Plains, N.Y.) was sequentially rinsed with water, rinsed with 4% sodium hydroxide solution, rinsed with water, rinsed with 4% hydrochloric acid solution, and rinsed with water. 750-ml of the retentate from Example 3 was mixed with the pre-treated rinsed resin in a beaker and was stirred for 30-minutes. The stirred mixture was filtered using a US standard No. 400 sieve. The resin was retained by the sieve and the filtrate was collected. The resin treated filtrate was freeze dried to obtain a soy protein product. The dried product was analyzed to determine the content thereof. The results of the analysis are shown in TABLE 4. All results are on moisture-free basis, unless otherwise stated.

TABLE 4

Composition of product derived from the method of EXAMPLE 4

| Composition | | μg/g of total dry matter | |
|---|---|---|---|
| Protein (wt. %) | | 85.71 | |
| Crude Fiber (wt. %) | | 0.50 | |
| Crude Fat (wt. %) | | 0.03 | |
| Ash (wt. %) | | 6.80 | |
| Fructose (wt. %) | | 0.32 | |
| Glucose/Galactose (wt. %) | | 0 | |
| Sucrose (wt. %) | | 2.83 | |
| Raffinose (wt. %) | | 0.39 | |
| Stachyose (wt. %) | | 2.22 | |
| Isoflavones | | | 187.9 |
| | Daidzin | | 18.1 |
| | Glycitin | | 0.9 |
| | Genistin | | 35.8 |
| | 6"-O-malonyldaidzin | | 16.0 |
| | 6"-O-malonylglycitin | | 0 |
| | 6"-O-acetyl genistin | | 7.0 |

TABLE 4-continued

Composition of product derived from the method of EXAMPLE 4

| Composition | | μg/g of total dry matter | |
|---|---|---|---|
| | 6"-O-malonylgenistin | | 69.4 |
| | Daidzein | | 11.2 |
| | Genistein | | 29.5 |
| Soyasapogenols | | | 3483.7 |
| | soyasapogenol A | | 767.4 |
| | soyasapogenol B | | 2716.3 |
| Nitrogen Solubility Index (NSI) (%) | | 61.2 | |

EXAMPLE 5

250.0 ml of a synthetic adsorbent resin (Dowex Optipore SD-2 Adsorbent from The Dow Chemical Company of Midland, Mich.) was sequentially rinsed with water, rinsed with 4% sodium hydroxide solution, rinsed with water, rinsed with 4% hydrochloric acid solution, and rinsed with water. 750-ml of the retentate from Example 3 was mixed with the pre-treated rinsed resin in a beaker and was stirred for 30-minutes. The stirred mixture was filtered using a US standard No. 400 sieve. The resin was retained by the sieve and the filtrate was collected. The resin treated filtrate was freeze dried to obtain a soy protein product. The dried product was analyzed to determine the content thereof. The results of the analysis are shown in TABLE 5. All results are on moisture-free basis, unless otherwise stated.

TABLE 5

Composition of product derived from the method of EXAMPLE 5

| Composition | | μg/g of total dry matter | |
|---|---|---|---|
| Protein (wt. %) | | 85.78 | |
| Crude Fiber (wt. %) | | 0.20 | |
| Crude Fat (wt. %) | | 0.04 | |
| Ash (wt. %) | | 7.18 | |
| Fructose (wt. %) | | 0.36 | |
| Glucose/Galactose (wt. %) | | 0 | |
| Sucrose (wt. %) | | 2.96 | |
| Raffinose (wt. %) | | 0.43 | |
| Stachyose (wt. %) | | 2.59 | |
| Isoflavones | | | 150.2 |
| | Daidzin | | 12.7 |
| | Glycitin | | 0.8 |
| | Genistin | | 39.2 |
| | 6"-O-malonyldaidzin | | 14.9 |
| | 6"-O-malonylglycitin | | 0 |
| | 6"-O-acetyl genistin | | 5.1 |
| | 6"-O-malonylgenistin | | 44.0 |
| | Daidzein | | 10.0 |
| | Genistein | | 23.5 |
| Soyasapogenols | | | 3663.3 |
| | soyasapogenol A | | 867.9 |
| | soyasapogenol B | | 2795.4 |
| Nitrogen Solubility Index (NSI) (%) | | 60.9 | |

EXAMPLE 6

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water was added to the slurry in the centrifuge feed tank and the slurry was mixed for 20 minutes. The pH of the slurry was 7.43. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and transferred to a membrane feed tank through a 100-mesh strainer. The suspension was fed to an ultrafiltration membrane system containing two spiral-wound membranes, both of 10,000 MWCO. The temperature of the suspension was maintained at about 26.7° C. (80° F.) during membrane processing. About 75% of the original feed volume added to the membrane feed tank was removed as permeate. About 1.0 L of the retentate from the membrane system was freeze dried. The dried product was analyzed to determine the content thereof. The results of the analysis are shown in TABLE 6. All results are on moisture-free basis, unless otherwise stated.

TABLE 6

Composition of product derived from the method of EXAMPLE 6

| Composition | | µg/g of total dry matter |
|---|---|---|
| Protein (wt. %) | 82.60 | |
| Crude Fiber (wt. %) | 0.61 | |
| Crude Fat (wt. %) | 0.05 | |
| Ash (wt. %) | 4.61 | |
| Fructose (wt. %) | 0.44 | |
| Glucose/Galactose (wt. %) | 0 | |
| Sucrose (wt. %) | 3.27 | |
| Raffinose (wt. %) | 0.52 | |
| Stachyose (wt. %) | 3.14 | |
| Isoflavones | 3342.8 | |
| Daidzin | | 430.7 |
| Glycitin | | 81.8 |
| Genistin | | 541.2 |
| 6"-O-malonyldaidzin | | 778.5 |
| 6"-O-malonylglycitin | | 104.0 |
| 6"-O-acetyl genistin | | 49.7 |
| 6"-O-malonylgenistin | | 1162.2 |
| Daidzein | | 90.4 |
| Genistein | | 104.3 |
| Soyasapogenols | 3296.6 | |
| soyasapogenol A | | 798.9 |
| soyasapogenol B | | 2497.7 |
| Nitrogen Solubility Index (NSI) (%) | 73.5 | |

EXAMPLE 7

250.0 ml of a synthetic adsorbent resin (SP850 from Mitsubishi Chemical America of White Plains, N.Y.) was sequentially rinsed with water, rinsed with 4% sodium hydroxide solution, rinsed with water, rinsed with 4% hydrochloric acid solution, and rinsed with water. 750-ml of the retentate from Example 6 was mixed with the pre-treated rinsed resin in a beaker and was stirred for 30-minutes. The stirred mixture was filtered using a US standard No. 400 sieve. The resin was retained by the sieve and the filtrate was collected. The resin treated filtrate was freeze dried to obtain a soy protein product. The dried product was analyzed to determine the content thereof. The results of the analysis are shown in TABLE 7. All results are on moisture-free basis, unless otherwise stated.

TABLE 7

Composition of product derived from the method of EXAMPLE 7

| Composition | | µg/g of total dry matter |
|---|---|---|
| Protein (wt. %) | 84.11 | |
| Crude Fiber (wt. %) | 0.61 | |
| Crude Fat (wt. %) | 0.05 | |
| Ash (wt. %) | 6.07 | |
| Fructose (wt. %) | 0.40 | |
| Glucose/Galactose (wt. %) | 0.55 | |
| Sucrose (wt. %) | 4.41 | |
| Raffinose (wt. %) | 0.45 | |
| Stachyose (wt. %) | 2.76 | |
| Isoflavones | 78.5 | |
| Daidzin | | 3.1 |
| Glycitin | | 17.1 |
| Genistin | | 0 |
| 6"-O-malonyldaidzin | | 6.1 |
| 6"-O-malonylglycitin | | 0 |
| 6"-O-acetyl genistin | | 2.4 |
| 6"-O-malonylgenistin | | 25.1 |
| Daidzein | | 3.8 |
| Genistein | | 20.9 |
| Soyasapogenols | 3450.7 | |
| soyasapogenol A | | 791.6 |
| soyasapogenol B | | 2659.1 |
| Nitrogen Solubility Index (NSI) (%) | 37.0 | |

EXAMPLE 8

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water preheated to 60° C. (140° F.) was added to the slurry in the centrifuge feed tank and the slurry was mixed for 20 minutes. The pH of the slurry was 7.52. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and transferred to a membrane feed tank through a 100-mesh strainer. The suspension was fed to an ultrafiltration membrane system containing two spiral-wound membranes, both of 10,000 MWCO. The temperature of the suspension was maintained at about 26.7° C. (80° F.) during membrane processing. About 75% of the original feed volume added to the membrane feed tank was removed as permeate.

The retentate collected from the membrane system was fed to the chromatography system at a flow rate of 946 ml per minute (0.25 gallons per minute). The chromatography system consisted of 5 columns connected in series, with each column containing 5.0 L of synthetic adsorbent resin, SP825 from Mitsubishi Chemical America of White Plains, N.Y. The chromatography system thus had 25.0 L of resin and the membrane retentate after passing through all the columns was collected. The chromatography treated stream was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 8. All results are on moisture-free basis, unless otherwise stated.

TABLE 8

Composition of product derived from the method of EXAMPLE 8

| Composition | | wt. % | μg/g of total dry matter |
|---|---|---|---|
| Protein (wt. %) | | 84.65 | |
| Crude Fiber (wt. %) | | 0.60 | |
| Crude Fat (wt. %) | | 0.06 | |
| Ash (wt. %) | | 4.99 | |
| Fructose (wt. %) | | 0.24 | |
| Glucose/Galactose (wt. %) | | 0.04 | |
| Sucrose (wt. %) | | 3.18 | |
| Raffinose (wt. %) | | 0.59 | |
| Stachyose (wt. %) | | 2.54 | |
| Isoflavones | | | 25.5 |
| | Daidzin | | 2.1 |
| | Glycitin | | 0 |
| | Genistin | | 8.5 |
| | 6"-O-malonyldaidzin | | 0 |
| | 6"-O-malonylglycitin | | 0 |
| | 6"-O-acetyl genistin | | 3.2 |
| | 6"-O-malonylgenistin | | 9.6 |
| | Daidzein | | 0 |
| | Genistein | | 2.1 |
| Soyasapogenols | | | 2664.1 |
| | soyasapogenol A | | 532.8 |
| | soyasapogenol B | | 2131.3 |
| Nitrogen Solubility Index (NSI) (%) | | 87.8 | |

TABLE 9

Composition of product derived from the method of EXAMPLE 9

| Composition | | wt. % | μg/g of total dry matter |
|---|---|---|---|
| Protein (wt. %) | | 85.32 | |
| Crude Fiber (wt. %) | | 0.83 | |
| Crude Fat (wt. %) | | 0.05 | |
| Ash (wt. %) | | 5.63 | |
| Fructose (wt. %) | | 0 | |
| Glucose/Galactose (wt. %) | | 0.36 | |
| Sucrose (wt. %) | | 2.75 | |
| Raffinose (wt. %) | | 0.59 | |
| Stachyose (wt. %) | | 2.43 | |
| Isoflavones | | | 62.5 |
| | Daidzin | | 2.1 |
| | Glycitin | | 0 |
| | Genistin | | 19.8 |
| | 6"-O-malonyldaidzin | | 2.1 |
| | 6"-O-malonylglycitin | | 0 |
| | 6"-O-acetyl genistin | | 5.2 |
| | 6-"-O-malonylgenistin | | 23.9 |
| | Daidzein | | 2.1 |
| | Genistein | | 7.3 |
| Soyasapogenols | | | 1967.9 |
| | soyasapogenol A | | 270.7 |
| | soyasapogenol B | | 1697.2 |
| Nitrogen Solubility Index (NSI) (%) | | 95.0 | |

EXAMPLE 9

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water preheated to 60° C. (140° F) was added to the slurry in the centrifuge feed tank and the slurry was mixed for 20 minutes. The pH of the slurry was 7.50. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and transferred to a membrane feed tank through a 100-mesh strainer. The suspension was fed to an ultrafiltration membrane system containing two spiral-wound membranes, both of 10,000 MWCO. The temperature of the suspension was maintained at about 26.7° C. (80° F.) during membrane processing. About 75% of the original feed volume added to the membrane feed tank was removed as permeate.

The retentate collected from the membrane system was fed to the chromatography system at a flow rate of 946 ml per minute (0.25 gallons per minute). The chromatography system consisted of 5 columns connected in series, with each column containing 5.0 L of synthetic adsorbent resin, SP825 from Mitsubishi Chemical America of White Plains, N.Y. The chromatography system thus had 25.0 L of resin and the membrane retentate after passing through all the columns was collected. The chromatography treated stream was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 9. All results are on moisture-free basis, unless otherwise stated.

EXAMPLE 10

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water preheated to 60° C. (140° F.) was added to the slurry in the centrifuge feed tank and the slurry was mixed for 20 minutes. The pH of the slurry was 7.69. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and transferred to a membrane feed tank through a 100-mesh strainer. The suspension was fed to an ultrafiltration membrane system containing two spiral-wound membranes, both of 10,000 MWCO. The temperature of the suspension was maintained at about 26.7° C. (80° F.) during membrane processing. About 75% of the original feed volume added to the membrane feed tank was removed as permeate.

The retentate collected from the membrane system was fed to the chromatography system at a flow rate of 946 ml per minute (0.25 gallons per minute). The chromatography system consisted of 5 columns connected in series, with each column containing 5.0 L of synthetic adsorbent resin, SP825 from Mitsubishi Chemical America of White Plains, N.Y. The chromatography system thus had 25.0 L of resin and the membrane retentate after passing through all the columns was collected. The chromatography treated stream was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 10. All results are on moisture-free basis, unless otherwise stated.

TABLE 10

Composition of product derived from the method of EXAMPLE 10

| Composition | | μg/g of total dry matter |
|---|---|---|
| Protein (wt. %) | | 84.92 |
| Crude Fiber (wt. %) | | 0.74 |
| Crude Fat (wt. %) | | 0.14 |
| Ash (wt. %) | | 2.92 |
| Fructose (wt. %) | | 0.25 |
| Glucose/Galactose (wt. %) | | 0 |
| Sucrose (wt. %) | | 3.23 |
| Raffinose (wt. %) | | 0.62 |
| Stachyose (wt. %) | | 2.70 |
| Isoflavones | | 182.9 |
| | Daidzin | 7.4 |
| | Glycitin | 0 |
| | Genistin | 50.4 |
| | 6"-O-malonyldaidzin | 16.8 |
| | 6"-O-malonylglycitin | 0 |
| | 6"-O-acetyl genistin | 7.4 |
| | 6"-O-malonylgenistin | 89.3 |
| | Daidzein | 2.1 |
| | Genistein | 9.5 |
| Soyasapogenols | | 2196.3 |
| | soyasapogenol A | 420.3 |
| | soyasapogenol B | 1776.0 |
| Nitrogen Solubility Index (NSI) (%) | | 95.1 |

TABLE 11

Composition of product derived from the method of EXAMPLE 11

| Composition | | μg/g of total dry matter |
|---|---|---|
| Protein (wt. %) | | 67.00 |
| Crude Fiber (wt. %) | | 3.16 |
| Crude Fat (wt. %) | | 0.16 |
| Ash (wt. %) | | 8.29 |
| Fructose (wt. %) | | 0.95 |
| Glucose/Galactose (wt. %) | | 0 |
| Sucrose (wt. %) | | 9.49 |
| Raffinose (wt. %) | | 1.45 |
| Stachyose (wt. %) | | 7.52 |
| Isoflavones | | 9.5 |
| | Daidzin | 2.1 |
| | Glycitin | 3.2 |
| | Genistin | 2.1 |
| | 6"-O-malonyldaidzin | 0 |
| | 6"-O-malonylglycitin | 0 |
| | 6"-O-acetyl genistin | 0 |
| | 6"-O-malonylgenistin | 2.1 |
| | Daidzein | 0 |
| | Genistein | 0 |
| Soyasapogenols | | 1305.8 |
| | soyasapogenol A | 136.9 |
| | soyasapogenol B | 1168.9 |
| Nitrogen Solubility Index (NSI) (%) | | 91.5 |
| Solubility Index (ml of sediment) | | 2.0 |
| Viscosity (cP) | | 32.7 |
| Chymotrypsin Inhibitor (CI) (mg/g) | | 152.8 |

EXAMPLE 11

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water preheated to 60° C. (140° F.) was added to the slurry in the centrifuge feed tank and the slurry was mixed for 20 minutes. The pH of the slurry was 7.48. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and further cooled to 51.7° C. (125° F.).

About 113.6 L (30 gallons) of the cooled suspension was transferred to the chromatography system feed tank through a 100-mesh strainer. The suspension was fed to the chromatography system at a flow rate of 946 ml per minute (0.25 gallons per minute). The chromatography system consisted of 5 columns connected in series, with each column containing 5.0 L of synthetic adsorbent resin, SP825 from Mitsubishi Chemical America of White Plains, N.Y. The chromatography system thus had 25.0 L of resin and the suspension after passing through all the columns was collected. The chromatography treated suspension was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 11. All results are on moisture-free basis, unless otherwise stated.

EXAMPLE 12

About 227.1 L (60 gallons) of water were added to a mixing tank and heated to 60° C. (140° F.). Then, about 45.4 kg (100 pounds) of soy flakes were added to the mixing tank to form a slurry. About 1400 ml of 4.5% sodium hydroxide solution was added to the mixing tank. The slurry was mixed for ten minutes and then transferred to a centrifuge feed tank. About 302.8 L (80 gallons) of water preheated to 60° C. (140° F.) was added to the slurry in the centrifuge feed tank and the slurry was mixed for 20 minutes. The pH of the slurry was 7.03. The slurry was fed at a rate of about 7.6 L per minute (2 gallons per minute) to a Sharples scroll-type centrifuge. The supernatant (suspension) was jet cooked at a temperature of about 126.7° C. (260° F.). The jet-cooked suspension was flash cooled and about 378.5 L (100 gallons) was transferred to a membrane feed tank through a 100-mesh strainer. The suspension was fed to an ultrafiltration membrane system containing two spiral-wound membranes, both of 10,000 MWCO. The temperature of the suspension was maintained at about 48.9° C. (1 20° F.) during membrane processing. After removing about 189.3 L (50 gallons) of permeate, 189.3 L (50 gallons) of water was added to the membrane feed tank. This step of permeate removal and water addition (diafiltration) was repeated twice again so that total volume of water added to membrane feed tank was 567.8 L (150 gallons). All the water added to membrane feed tank and about 80% of the original feed volume added to the membrane feed tank was removed as permeate so that the total volume of permeate removed was 870.6 L (230 gallons).

The retentate collected from the membrane system was fed to the chromatography system at a flow rate of 946 ml per minute (0.25 gallons per minute). The chromatography system consisted of 5 columns connected in series, with each column containing 5.0 L of synthetic adsorbent resin, SP825 from Mitsubishi Chemical America of White Plains, N.Y. The chromatography system thus had 25.0 L of resin and the membrane retentate after passing through all the columns was collected. The chromatography treated suspension was pasteurized at about 82.2° C. (180° F.) and spray dried using a high-pressure pump feeding a spray nozzle in a vertical spray dryer. The dried product was analyzed to determine the content thereof. The results of the analysis are shown in TABLE 12. All results are on moisture-free basis, unless otherwise stated.

TABLE 12

Composition of product derived from the method of EXAMPLE 12

| Composition | | μg/g of total dry matter |
|---|---|---|
| Protein (wt. %) | 93.84 | |
| Crude Fiber (wt. %) | 0.53 | |
| Crude Fat (wt. %) | 0.04 | |
| Ash (wt. %) | 5.19 | |
| Fructose (wt. %) | 0 | |
| Glucose/Galactose (wt. %) | 0 | |
| Sucrose (wt. %) | 0.49 | |
| Raffinose (wt. %) | 0.11 | |
| Stachyose (wt. %) | 0.48 | |
| Isoflavones | | 18.7 |
| Daidzin | | 0 |
| Glycitin | | 0 |
| Genistin | | 4.5 |
| 6″-O-malonyldaidzin | | 0 |
| 6″-O-malonylglycitin | | 0 |
| 6″-O-acetyl genistin | | 0 |
| 6″-O-malonylgenistin | | 5.9 |
| Daidzein | | 0.8 |
| Genistein | | 7.5 |
| Soyasapogenols | | 3137.5 |
| soyasapogenol A | | 537.0 |
| soyasapogenol B | | 2600.5 |
| Nitrogen Solubility Index (NSI) (%) | 92.4 | |
| Solubility Index (ml of sediment) | 3.0 | |
| Viscosity (cP) | 174.5 | |
| Chymotrypsin Inhibitor (CI) (mg/g) | 262.1 | |

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A soy protein material, comprising:
   a protein content of at least about 55.0 wt. % of total dry matter;
   an isoflavone content of less than about 200 μg/g of total dry matter; and
   a soyasapogenols content of at least about 1000 μg/g of total dry matter; wherein the soy protein material is prepared by a process comprising the steps of:
   providing a substantially defatted soybean material;
   mixing the defatted soybean material with water to form a protein extract and a slurry of insolubles;
   separating insolubles to form a liquor;
   heat treating the liquor;
   ultrafiltering the liquor, using an ultrafiltration membrane having a molecular weight cut-off between about 5,000 and about 60,000;
   subjecting the retentate liquor to an adsorption process to remove isoflavones; and
   pasteurizing the isoflavones-depleted liquor.

2. The soy protein material of claim 1, further comprising a Nitrogen Solubility Index ("NSI") of at least about 70%.

3. The soy protein material of claim 1, wherein said isoflavone content is less than about 150 μg/g of total dry matter.

4. The soy protein material of claim 1, wherein said protein content is at least about 65.0 wt. % of total dry matter.

5. The soy protein material of claim 1, wherein said protein content is at least about 90.0 wt. % of total dry matter.

6. The soy protein material of claim 1, further comprising a crude fiber content of less than about 3.0 wt. % of total dry matter.

7. The soy protein material of claim 1, further comprising a Chymotrypsin Inhibitor ("CI") content of at least about 100 mg/g.

8. The soy protein material of claim 1, wherein a solution of about 12.0 wt. % of said soy protein material in water at a temperature of about 22° C. has a viscosity of less than about 500 centipoise (cp).

9. The soy protein material of claim 1, further comprising a solubility index of less than about 10.0 ml sediment.

10. A liquid or dry beverage, food or nutritional product including the soy protein material of claim 1.

11. The soy protein material of claim 1, further comprising, after said pasteurization step, the additional step of drying the liquor to provide a soy protein material in solid form.

12. The soy protein material of claim 1, wherein said ultrafiltration step is conducted at a temperature of between about 25° C. and about 60° C.

13. The soy protein material of claim 1, wherein said mixing step further comprises adjusting the pH of the slurry to between about 6.8 and about 10.0.

14. The soy protein material of claim 1, wherein the mixture in said mixing step contains from about 5.0 wt. % to about 15.0 wt. % solids.

15. The soy protein material of claim 1, wherein said heat treating step comprises a jet cooking process.

* * * * *